US008303886B2

(12) United States Patent
Philippi

(10) Patent No.: US 8,303,886 B2
(45) Date of Patent: Nov. 6, 2012

(54) METHOD OF MANUFACTURING A THREE-DIMENSIONAL OBJECT

(75) Inventor: Jochen Philippi, Graefelfing (DE)

(73) Assignee: EOS GmbH Electro Optical Systems, Krailling (DE)

( * ) Notice: Subject to any disclaimer, the term of this patent is extended or adjusted under 35 U.S.C. 154(b) by 0 days.

(21) Appl. No.: 12/317,265

(22) Filed: Dec. 19, 2008

(65) Prior Publication Data
US 2009/0179353 A1 Jul. 16, 2009

(30) Foreign Application Priority Data
Dec. 21, 2007 (DE) .......................... 10 2007 062 129

(51) Int. Cl.
*B29C 35/08* (2006.01)
*H05B 6/00* (2006.01)
*G01B 15/00* (2006.01)

(52) U.S. Cl. ........................................ 264/497; 264/406
(58) Field of Classification Search .................. 264/497, 264/406
See application file for complete search history.

(56) References Cited

U.S. PATENT DOCUMENTS

| | | | |
|---|---|---|---|
| 5,753,171 A | 5/1998 | Serbin et al. | |
| 5,978,627 A * | 11/1999 | Masuda | 399/159 |
| 6,085,122 A | 7/2000 | Manning | |
| 6,325,961 B1 * | 12/2001 | Beers et al. | 264/401 |
| 2004/0122559 A1 * | 6/2004 | Young et al. | 700/269 |
| 2006/0215246 A1 | 9/2006 | Kerekes et al. | |
| 2007/0196561 A1 | 8/2007 | Philippi et al. | |
| 2008/0117944 A1 * | 5/2008 | Dawson et al. | 372/38.04 |

FOREIGN PATENT DOCUMENTS

| | | |
|---|---|---|
| CN | 1729068 | 2/2006 |
| CN | 1976800 | 6/2007 |
| DE | 10 2006 012 442 A1 | 4/2007 |
| DE | 10 2006 043 822 A1 | 3/2008 |
| EP | 0 758 952 B1 | 4/1998 |
| EP | 1 033 229 | 9/2000 |
| EP | 1 270 184 | 1/2003 |
| EP | 1 705 616 A1 | 9/2006 |
| JP | 2000-296560 | 10/2000 |
| RU | 2 217 265 | 11/2003 |
| WO | WO 2004/056512 | 7/2004 |

OTHER PUBLICATIONS

N. Dokhane and G. L. Lippi (IEE Proceedings-Optoelectronics, vol. 151, No. 2, p. 61-68 (2004).*

* cited by examiner

*Primary Examiner* — Yogendra Gupta
*Assistant Examiner* — Jeremiah Smith
(74) *Attorney, Agent, or Firm* — Edwards Wildman Palmer LLP; George W. Neuner

(57) ABSTRACT

A method of manufacturing a three-dimensional object is disclosed, in which the object is solidified layer by layer by solidifying a building material by means of a beam of a gas laser at locations in each layer corresponding to the cross section of the object, wherein the power of the laser is measured and the power of the laser is controlled according to the measured value. The power measurement takes place in a time window, in which a change of the power occurs, and an input control signal of the laser is controlled according to the measured values.

6 Claims, 3 Drawing Sheets

METHOD OF MANUFACTURING A THREE-DIMENSIONAL OBJECT

FIELD OF THE INVENTION

The invention relates to a method of manufacturing a three-dimensional object, in which the object is solidified layer by layer by solidifying a building material by means of a beam of a gas laser at locations in the layer corresponding to the cross section of the object, wherein the power of the laser is measured and the power of the laser is controlled according to the measured value.

EP-0 758 952 B1 discloses a method of manufacturing a three-dimensional object by means of laser sintering, wherein the position, the power and/or the diameter of the laser beam at a location direct above the layer is measured, which is to be solidified, and wherein the result of the measurement is compared with predetermined reference values, and on the basis of the comparison, an error is displayed or the beam is corrected. Preferably, a solid state laser is used in the method.

EP-1 705 616 A1 discloses a method that relates to a control of the laser power in a rapid prototyping system such as a stereolithography system or a laser sintering system. In such rapid prototyping systems, the object is solidified layer by layer by solidifying a liquid building material in case of stereolithography and by solidifying a powder building material in case of laser sintering by means of a laser beam at the locations in each layer corresponding to the cross section of the object in the layer. At the same time, the laser beam is deflected by a scanner system such that the beam is guided along lines such as vectors over the layer. An optimum exposure is desired for each area of the object to be manufactured, which can be equal for all areas or different from area to area. In the known method, the power of the laser beam is measured by means of a power measuring apparatus, and thereafter, the laser power is regulated such that the desired power and depth of the exposure is achieved.

In particular in gas lasers such as $CO_2$-lasers, there is a problem that deviations of the power of the laser for short and long periods highly depend on the previous conditions of the laser operation, which are continuously changed. A simple closed loop control as performed in EP-1 705 616 A1 is, however, not suitable to achieve a stable laser power for a long period.

It is the object of the invention to provide a method of manufacturing a three-dimensional object by means of rapid prototyping, in which a gas laser such as a $CO_2$-laser is used, and in which the deviations of the power of the laser for short and long periods can be eliminated so that the quality of the first manufactured object is improved.

In accord with the present invention, a method of manufacturing a three-dimensional object, in which the object is solidified layer by layer by solidifying a building material by means of a beam of a gas laser at locations in the layer corresponding to the cross section of the object, wherein the power of the laser is measured and the power of the laser is controlled according to the measured value, is characterized in that the power measurement takes place in a time window, in which a change of the power occurs, and that an input control signal of the laser is controlled according to the measured values.

Preferred embodiments of the invention include one or more of the following features:

a. the change of the power abruptly occurs;
b. the change of the power is a switch-on operation, a switch-off operation or a switching between two power values;
c. the laser beam is guided in tracks above the layer, wherein each track has a beginning and wherein the laser is switched-on at the beginning of the track and the power measurement is made at the switch-on operation;
d. according to the measured values, a switch-on ramp is determined and the input control signal of the laser is changed at the switch-on operation according to the switch-on ramp;
e. the laser beam is guided in tracks above the layer and the track has a beginning and an end, wherein the laser is switched-on at the beginning of the track and switched-off at the end of the track, and wherein the input control signals of the laser of a later track depend on the measured values of the power during the switch-on operation of an earlier track;
f. the control is iteratively performed;
g. the laser is a $CO_2$-laser; and
h. a sensor is used as a means for measuring the power, which has a response delay of about 10 µs or less.

SUMMARY OF THE INVENTION

In particular, the method has the advantage that the input control signal of the laser can be adjusted by automatic evaluation of the laser power in a very short delay and that switch-on effects can be avoided by specific switch-on ramps. In this way, deviations of the laser power in a range of 10 µs can be compensated for.

Further features and advantages of the invention are indicated in the description of an embodiment on the basis of the figures. To the figures:

DETAILED DESCRIPTION OF PREFERRED EMBODIMENTS

Figure 1:
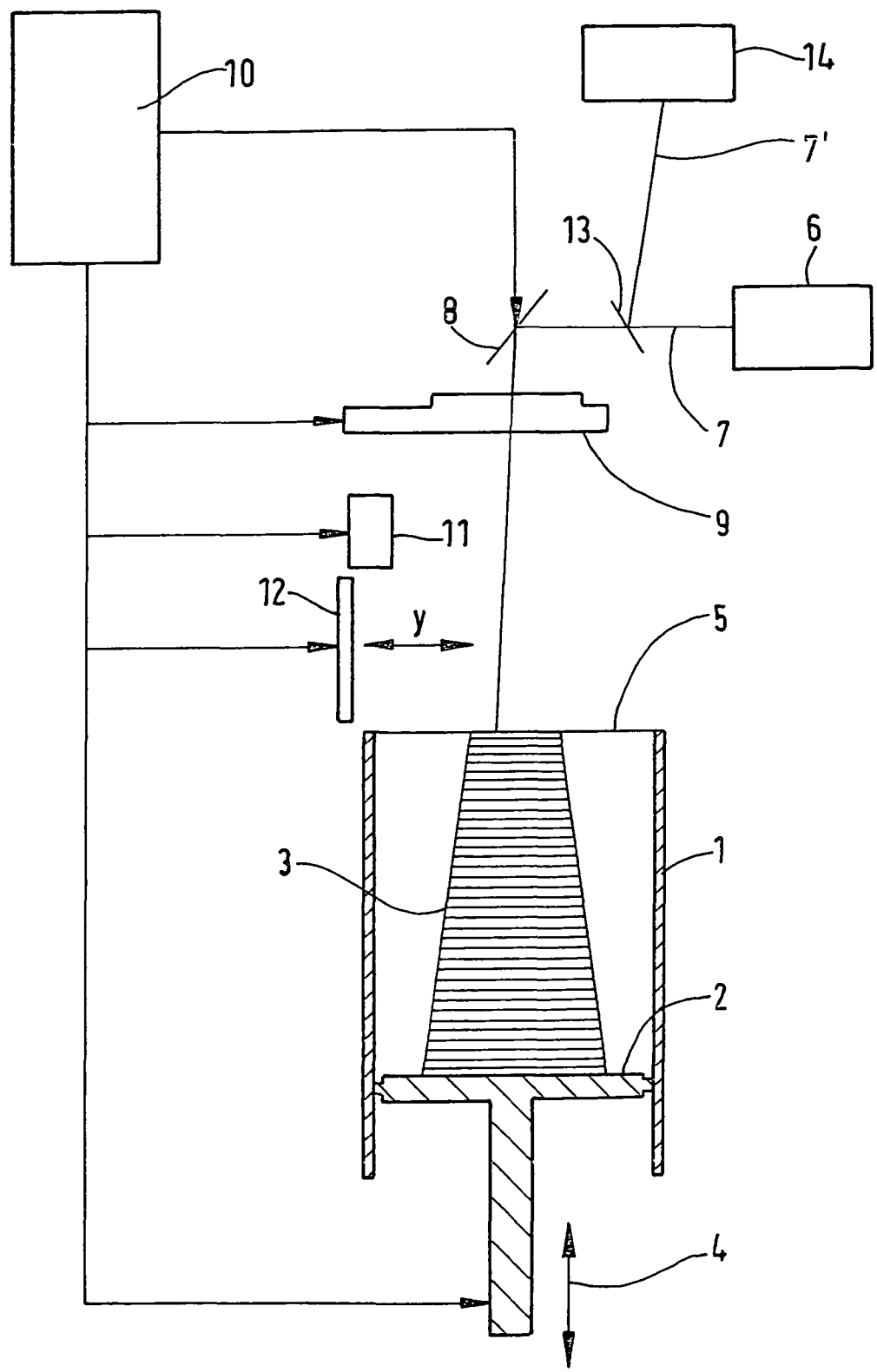
FIG. 1 is a schematic view of a laser sintering device.

In the following, a laser sintering device having the laser control according to the invention is described with reference to FIG. 1.

The device comprises a building container 1, in which a support 2 for supporting of an object 3 to be built is provided. The support 2 is movable in a vertical direction within the building container by a height adjusting means 4. The plane, in which the applied powder building material is solidified, defines a working plane 5. For solidifying the powder material within the working plane 5, a laser 6 is provided, which can be formed as a gas laser such as a $CO_2$-laser. The laser 6 generates a laser beam 7, which is focussed by a deflection means 8, for example in the shape of one or more deflection mirrors rotated by a rotation unit (not shown), and a focussing unit 9 onto the working plane 5. A control 10 is provided for controlling the deflection means 8 and, if necessary, the focussing unit 10 such that the laser beam 7 can be deflected to any location in the working plane 5.

Further, a supply device 11 is provided for supplying the powder building material for a subsequent layer. By means of a dispenser 12, the building material is applied and flattened in the working plane 5.

A part 7' of the laser beam 7 in the laser beam path is coupled out by means of a partly transparent mirror 13 inside the laser or outside thereof, as shown in FIG. 1. The partly transparent mirror 13 is formed to couple out of less than about 1% of the power. In the described embodiment, the partly transparent mirror 13 is arranged in the beam path in front of the deflection means 8. The out-coupled beam 7' impinges into a sensor 14 for measuring the power. The sensor 14 is preferably formed as an atom layer thermopile sensor (thermopile sensor). The sensor has a short response delay of about 10 μs. Thereby, the resolution of single pulses of the laser is possible. In particular, the sensor is formed to enable recording of the switch-on property of the laser simultaneously to the normal building operation.

During operation, the support 2 is lowered layer by layer, a new powder layer is applied and solidified by the laser beam 7 at the locations in each layer in the working plane 5 corresponding to the object. At the same time, the deflection means 8 is controlled such that the laser beam 7 is guided along tracks above the working plane 5. For example, a known exposure pattern is the exposure of a plurality of parallel tracks side by side. Usually, the laser is switched off at the end of the track, and the laser is switched on at the beginning of a new track.

Figure 2:
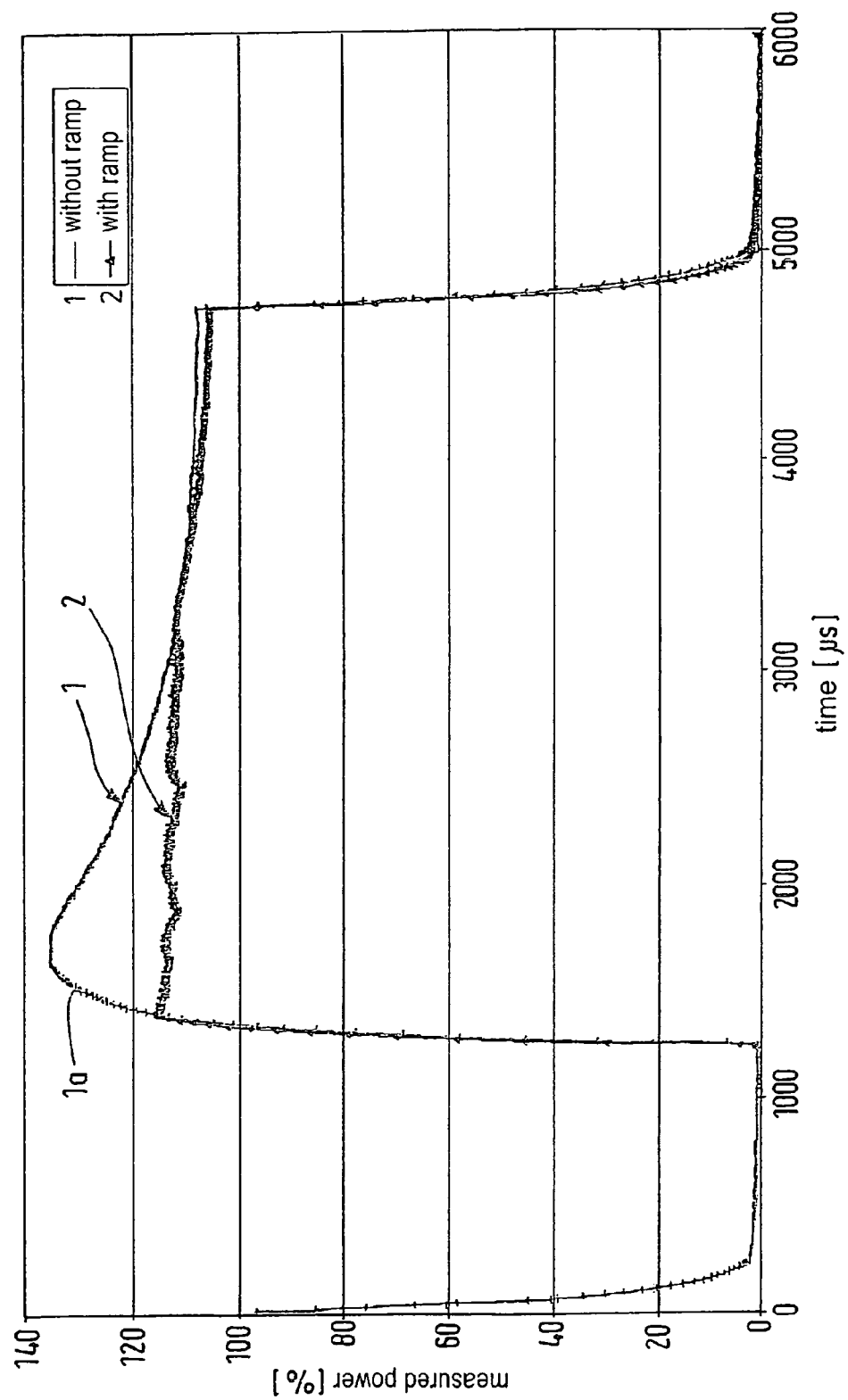
FIG. 2 is a graph of the measured power against the time with and without switch-on ramp in a track exposed by the laser beam in a layer.

FIG. 2 shows the power of the laser against the time for one track, which is measured by the sensor 14. The curve 1 shows the measured laser power, when the control according to the invention is not carried out. In this case, switching-on of the laser involves an overshoot 1a, as clearly visible in the left part of the curve, that means the power is too high at the beginning of the track. This results to inaccuracies in building the object, if all or most of the tracks exhibit such a power deviation, since solidification does not evenly occur along the track.

In the method according to the preferred embodiment, the power of the laser is measured by the sensor 14 within a time period in real-time corresponding the time period for the switch-on operation including the overshoot. This time period is shown in FIG. 2 by $\Delta t_1$.

A switch-on ramp for the input control signal of the laser is determined from the measured power values, wherein the switch-on ramp indicates the dependency of the control input signal against the time for the switch-on operation $\Delta t_1$ and wherein the switch-on ramp is selected to compensate for the overshoot 1a in the curve 1 as shown in FIG. 2. The curve 2 as shown in FIG. 2 represents the measured power in the case that the input control signal is changed according to the selected switch-on ramp in the switch-on operation.

Figure 3:
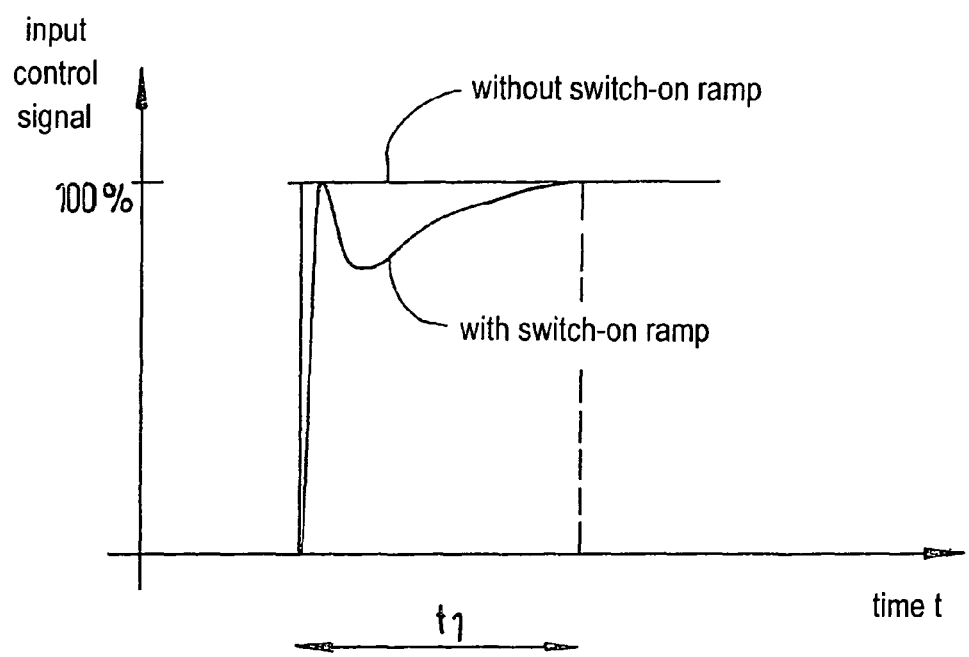
FIG. 3 is a schematic curve of the input control signal for the laser.

FIG. 3 schematically shows the value of the input control signal against the time. When no switch-on ramp is used, the input control signal is sharply changed from zero to the predetermined value. This results to the overshoot as shown in FIG. 2. By use of the switch-on ramp, the value of the input control signal increases according to a predetermined function. FIG. 3 shows an advantageous shape of this function having a start impulse followed by a temporary attenuation of the control signal, thereby quickly achieving the target power of the laser, while the overshoot according to FIG. 2 is prevented at the same time.

The switch-on ramp indicates the control power against the time. This ramp is a function of several parameters and particularly depends on the desired laser power, the break before switching on the laser as well as on the aggregation of the previous switching conditions. For example, the ramp can be empirically determined and the parameters can be recorded in a table, or a function to be calculated can be defined.

Figure 4:
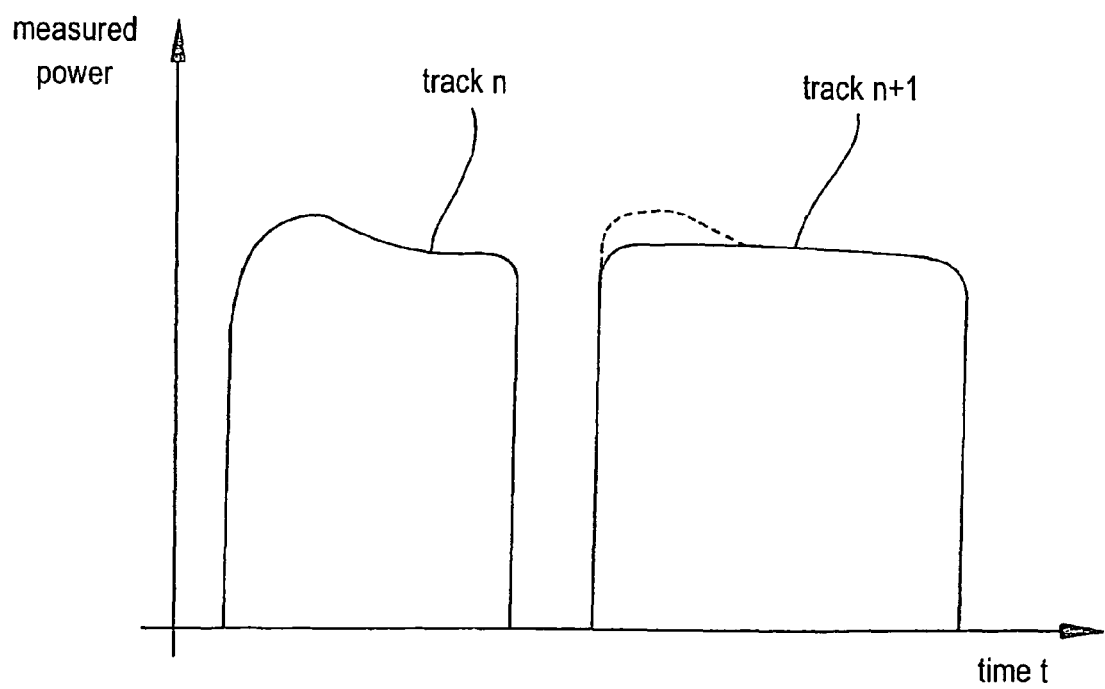
FIG. 4 is a schematic view of the measured power for two subsequent tracks.

As shown in FIG. 4, many tracks succeed to each other, for example, track n and track n+1, which are tracked in the layer by the laser. The switch-on ramp determined by the real-time measurement of the laser power during the switch-on operation in the track n for eliminating the overshoot is already taken into account for the next track n+1. The power, which is measured in the track n+1 during the switch-on operation, can in turn be used for correcting the switch-on ramp for the subsequent track. Thus, the method is iterative.

By the disclosed method, deviations of the power of the laser up to the range of the time resolution of the sensor 14 can be compensated for, that means up to the range of about 10 μs. Thereby, stabilization of the power of the laser is performed for a long period, since the stabilization does not depend anymore on the history of the laser operation, which is continuously changed.

In a modified embodiment, the operation of the laser is monitored by the sensor for a long time period without stabilization, and on the basis of the measured power curves, classification of specific operation modes or specific exposure patterns is carried out, and suitable switch-on ramps are calculated there from. Then, the control of the power of the laser is adapted to the respective lasers on the basis of the predefined switch-on ramps by the above-described iterative process.

Further, it is possible to record the power of the laser and to allocate the power of the laser to the used tracks for a recorded time period.

In a further modification, the switch-on behaviour can be adapted to acceleration behaviour within the track to be exposed.

The invention is not restricted to the above-described embodiment. The invention can be used for all rapid prototyping methods using a gas laser.

Further, the invention is not restricted in controlling the power of the laser on the basis of the switch-on behaviour, but all operations can be measured and controlled, in which the power of the laser is changed, such as the switch-off operation and operations including changes from low power of laser to high power of laser and vice versa.

The invention claimed is:

1. A method of manufacturing a three-dimensional object, in which the object is solidified layer by layer by solidifying a building material by means of a beam of a gas laser at locations in the layer corresponding to the cross section of the object, wherein the solidifying of the building material comprises the selective solidification of a powder material, the method comprising:

splitting an output of the laser into a first component to be impinged on the powder material and a second component to be measured by a sensor, thereby facilitating simultaneous measurement of output power and solidification of the powder;

solidifying a first track of the three-dimensional object by switching the laser on at the beginning of the first track and switching the laser off at the end of the first track;

measuring the power of the laser in a time window in which solidification of the first track occurs, the time window including: i) the switch-on operation, ii) the switch-off operation, iii) an abrupt change of power between two power values, or some combination of at least two of i)-iii);

using the measurement of power during solidification of the first track to generate an input control signal for the laser for solidification of a subsequent track, the input control signal including a switch-on ramp having a start impulse followed by a temporary attenuation of the input control signal; and solidifying the subsequent track of the three dimensional object by actuating the laser according to the input control signal generated from the measurement of the first track, wherein the solidification of the subsequent track follows the solidification of the first track.

2. The method according to claim 1, further comprising: measuring the power with a sensor that has a response delay of about 10 µs or less to enable resolution of single pulses of the laser, wherein the input control signals of the laser of a later track depend on the measured values of the power of the laser during the switch-on operation of an earlier track.

3. The method according to claim 1, further comprising iteratively measuring the power of the laser in a time window, in which solidification of a track occurs, to generate an input control signal for the laser for solidification of a subsequent track.

4. The method according to claim 1, wherein the laser is a $CO_2$-laser.

5. The method according to claim 2, wherein the sensor is formed to enable recording of the switch-on property of the laser simultaneously with the normal building operation.

6. The method according to claim 2, wherein the sensor is formed as an atom layer thermopile sensor.

* * * * *